(12) United States Patent
Faus et al.

(10) Patent No.: US 8,423,993 B2
(45) Date of Patent: Apr. 16, 2013

(54) SYSTEMS AND METHODS FOR MANAGING SOFTWARE PATCHES

(75) Inventors: Norman Lee Faus, Raleigh, NC (US); David P. Huff, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1142 days.

(21) Appl. No.: 12/040,740

(22) Filed: Feb. 29, 2008

(65) Prior Publication Data

US 2009/0222811 A1 Sep. 3, 2009

(51) Int. Cl.
G06F 9/44 (2006.01)

(52) U.S. Cl.
USPC .................. 717/173; 717/169; 717/170

(58) Field of Classification Search .......... 717/168–178
See application file for complete search history.

(56) References Cited

U.S. PATENT DOCUMENTS

| | | | |
|---|---|---|---|
| 6,363,499 B1 * | 3/2002 | Delo et al. ................. | 714/15 |
| 6,438,749 B1 * | 8/2002 | Chamberlain ............... | 717/174 |
| 7,080,371 B1 * | 7/2006 | Arnaiz et al. ............... | 717/170 |
| 7,620,948 B1 * | 11/2009 | Rowe et al. ................ | 717/171 |
| 2004/0210653 A1 * | 10/2004 | Kanoor et al. .............. | 709/223 |
| 2004/0243978 A1 * | 12/2004 | Walmsley .................. | 717/120 |
| 2006/0048131 A1 * | 3/2006 | Napier et al. ............... | 717/168 |
| 2006/0112375 A1 * | 5/2006 | Schneider .................. | 717/131 |
| 2007/0106979 A1 * | 5/2007 | Felts ........................ | 717/124 |
| 2008/0028389 A1 * | 1/2008 | Genty et al. ................ | 717/174 |
| 2008/0155526 A1 * | 6/2008 | Gokhale ..................... | 717/169 |
| 2008/0178168 A1 * | 7/2008 | Sriram et al. ............... | 717/169 |
| 2008/0244556 A1 * | 10/2008 | Plante et al. ............... | 717/170 |

OTHER PUBLICATIONS

Jan Vidar Simonsen, Patch Management Security, Jul. 1, 2005, Masters Thesis, Department of Computer Science and Media Technology Gjovik University College.*

* cited by examiner

*Primary Examiner* — Lewis A Bullock, Jr.
*Assistant Examiner* — Tina Huynh
(74) *Attorney, Agent, or Firm* — Lowenstein Sandler LLP

(57) ABSTRACT

Embodiments relate to systems and methods for managing software patches. Embodiments incorporate a patch server that collects aggregate patch history information from a community of software application users. The set of available patches for a given software application can be registered to a data store, and the number of uses electing to install a patch, as well as usage information such as the frequency of bug reports or rollbacks associated with individual patches can be tracked. When a user desires to update a software application, the various available patches and their combined usage history can be displayed in a patch selection dialog. The user can view and select the patch version best suited to their needs, for example to best match their particular hardware configuration, or to install a patch having the fewest bug reports.

12 Claims, 4 Drawing Sheets

SYSTEMS AND METHODS FOR MANAGING SOFTWARE PATCHES

FIELD

The present teachings relate to techniques for managing software patches, and more particularly to systems and methods for monitoring software patch usage in a population of users and providing patch distribution options based on that usage behavior.

BACKGROUND OF RELATED ART

It has become conventional in the software industry for software vendors to release updates or patches to their products on a regular basis. An application provider, for example, can produce a major release or version of a software application, after which the user community can install and use the application. Over time, bug reports and other feedback can be received by the vendor, followed by engineering fixes to reported bugs. Often, the software vendor will make a downloadable patch or software update available to users of the main or most recent version, to remedy the known bug or stability issues.

The process of user installation and verification of proper operation continues with each software patch made available by a software vendor. After a given patch is distributed, it may be discovered, for example, that the patched version of the software fails to operate properly on certain hardware, or that the patched version causes other specific applications to crash. After a period of time, a flawed patch may be followed by a follow-on patch designed to correct the instabilities of the preceding patch. That succeeding patch itself is then distributed and bug reports can accumulate on that patch version as well. As the generations of patches are distributed, some users who discover incompatibilities with their software or hardware configuration may choose to revert to a prior software version to restore stable operation.

Using current download options, a user who wishes to select and download a patch to a software application has no way to be apprised of the various versions of the patched software available to them, nor the nature of reported bugs or collective patch selections and results achieved by the community of other users of the software application. It may be desirable to provide methods and systems to manage software patches that track, display and distribute patches with a comprehensive patch history visible to the user, to permit more selective patch updating that is better attuned to user needs.

DESCRIPTION OF THE DRAWINGS

The accompanying drawings, which are incorporated in and constitute a part of this specification, illustrate embodiments of the present teachings and together with the description serve to explain the principles of the present teachings. In the figures.

DESCRIPTION OF EMBODIMENTS

Figure 1:
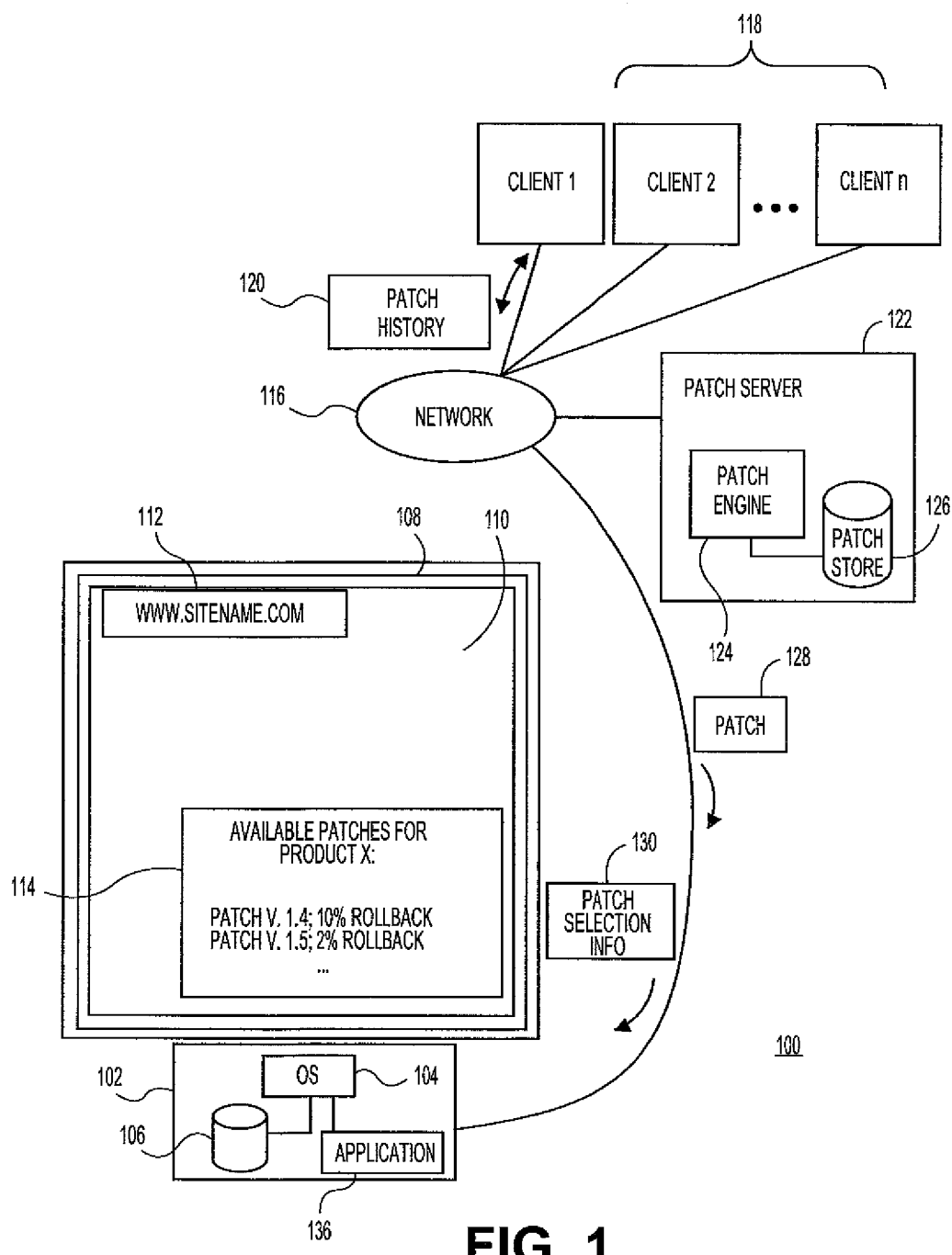
FIG. 1 illustrates an overall system for managing software patches, according to various embodiments.

Embodiments relate to systems and methods for managing software patches, in which in general a patch server collects information on patch histories from a community of users and manages the distribution of existing and new patches to users based on collective patch usage information. As used in some embodiments herein, a "patch" refers to a piece of software code that can be added to, or substituted into, an existing software application to correct one or more bugs or issues in the software application. In embodiments, the patch can be downloaded in the form of an executable file (.exe format) that the user can click on to run and install the patch. The patch can also be distributed using a script-based platform such as JavaScript™ or other scripts or active code. In some embodiments, the patch can be a binary difference patch where differences between the main code of the software application and patched section or sections are detected, and the patched or updated software is integrated into only those sections requiring an update.

In general, a patch server can host and distribute one or more patches to a software application or applications. The patch server can record the patch history of each version of a patch as that patch version is distributed to the user community. The patch history can reflect the aggregate usage of the patch in the user pool, including for example the number of times a patch has been downloaded and installed, the number of times that the patch has been replaced by a succeeding patch, or the number of times the user has reverted or "rolled back" to a prior version of the patch. Other data related to the implementation and behavior of the patch, such as the number of bug reports attributed to that patch, can also be captured and recorded in the patch history.

A user can operate a client to navigate to or otherwise access a Web site or other download source to browse the available patches and select an appropriate patch, for instance by selecting an HTML (hyper text markup language) or XML (extensible markup language) link in a dialog list. The user can then initiate the selection, download, and installation of a selected patch to a software application. The patch server can match the installed software application to which the user wishes to apply a patch against the patch history to identify the set of available patches and related patch history. The patch server transmits a set of patch selection information to the client operated by the user. The client presents a patch selection dialog to the user, in which one or more versions of an available group of patches for the subject software application are displayed.

Additional information, such as the number of bug reports or frequency of patch rollbacks for each available patch, can also be displayed. The user can select, download, and install the patch they conclude is most appropriate for the software application of interest and their particular hardware and software configuration, based on the patch selection information. In certain embodiments, the user can create a restore point before installing the patch, to return to a prior configuration state if the patch should prove to introduce instabilities to the user's system. These and other embodiments described herein address the various noted shortcomings in known patch distribution technology, and provide an enhanced and more informative set of user patch options.

Reference will now be made in detail to exemplary embodiments of the invention, which are illustrated in the accompanying drawings. Where possible the same reference numbers will be used throughout the drawings to refer to the same or like parts.

FIG. 1 illustrates an overall system 100 consistent with various embodiments of systems and methods for managing software patches, according to the present teachings. In embodiments as shown, a user can operate a browser 110 on a client 102 to navigate or browse to a download site 112 via network 116. Browser 110 can be a Web browser, such as the Firefox™, Opera™, or other open-source or proprietary browser application.

Client 102 can host and run under control of an operating system 104, such as a distribution of the Linux™ operating system, the Unix™ operating system, or other open-source or proprietary operating system. Client 102 can present a user interface 108, such as a graphical user interface, to the user via operating system 104. Client 102 can contain or access resources including a client data store 106, such as a local database stored on a hard drive.

A user can operate browser 110 on client 102 to navigate to download site 112. Download site 112 one or more searchable or selectable software patches that the user can select or activate for download to client 102. Download site 112 can be identified by a uniform resource locator (URL), which can be in http://wwvw.sitename.com format under the hyper text transfer protocol (http). In embodiments, other types or formats of site addressing or identification can be used. Network 116 can be or include the Internet, or other public or private networks. Download site 112 can be hosted by a patch server 122, such as a Web server.

In terms of generation and distribution of software patches, a patch server 122 can communicate with a set of patch-installed clients 118 via network 116. Each client in the set of patch-installed clients can communicate one or more patch history 120 captured on that client to patch server 122. The patch history 120 received from each client can contain a record of the underlying software application(s) installed on that client in the set of patch-installed clients 118, along with the history of any patches installed on applications installed on respective clients. Patch history 120 can record, for example, the version numbers, installation dates and times, install directories, bug or error logs, or other information recording to the patch events that have taken place on a given client.

Patch server 122 can also host a patch engine 124 that carries out the receipt and aggregation of the patch history 120 records received from the set of patch-installed clients 118. Patch engine 124 stores the patch history 120 aggregated from all participating clients in the set of patch-installed clients 118 to patch store 126, such as a relational data base or other data store. Patch store 126 likewise stores one or more patch 128 for each software application registered to patch store 126 and managed by patch engine 124. Patch 128 itself can be encoded as an executable (.exe file extension) file, or be delivered via active script or code such as JavaScript™, XML (extensible markup language), or other script or code. Patch 128 updates application 136, for example by performing a binary-difference comparison and substituting updated code where differences are detected. Download site 112 can be operated, for instance, by an independent software vendor (ISV), or other distributor, vendor, or entity.

In general, the user operates browser 110 to browse or navigate to download site 112 to identify a patch 128 to initiate downloading activity. The user can view a list of applications and/or search for an application to patch in patch select dialog 114 presented in via browser 110. The identity of the software application selected for updating/patching is transmitted in the form of a software product ID from client 102 to patch server 122. Patch engine 124 of patch server 122 can perform a search against patch store 126 to locate the subject application and retrieve a set of available patches for that application, along with data from patch history 120 associated with the application. Patch engine 124 transmits patch selection information 130 containing the set of available patches along with associated patch history 120 to client 102. Client 102 presents one or more associated patches along with data from patch history 120 to the user via patch selection dialog 114.

Patch selection dialog 114 can present the user with a list of available patches for the subject application 136, along with the histories of different versions of the available patches for the user to view and select from. For example, patch selection dialog 114 can list Patch 1 having a version number of 2.2 and a release date of Jan. 1, 2006, a total number of downloads, a total number of installation rollbacks, and an indication of known software or hardware incompatibilities for that patch version. Patch selection dialog 114 can list similar history or information for Patch 2, Patch 3, or other associated numbers or versions of patches extracted from patch store 126 for the subject application 136.

The user can view the resulting grouping of available patches in patch selection dialog 114 and select a patch 128 to download and/or install, based on the comprehensive view of the patch history of application 136 across multiple generations of patches, and aggregated from a community of user experiences captured from the set of patch-installed clients 118. A user can therefore in one regard make better-optimized selections of patch updates to their installed software, and avoid incompatibilities and other update issues that would be difficult to identify without a view on a collective patch history for a software product.

Figure 2:
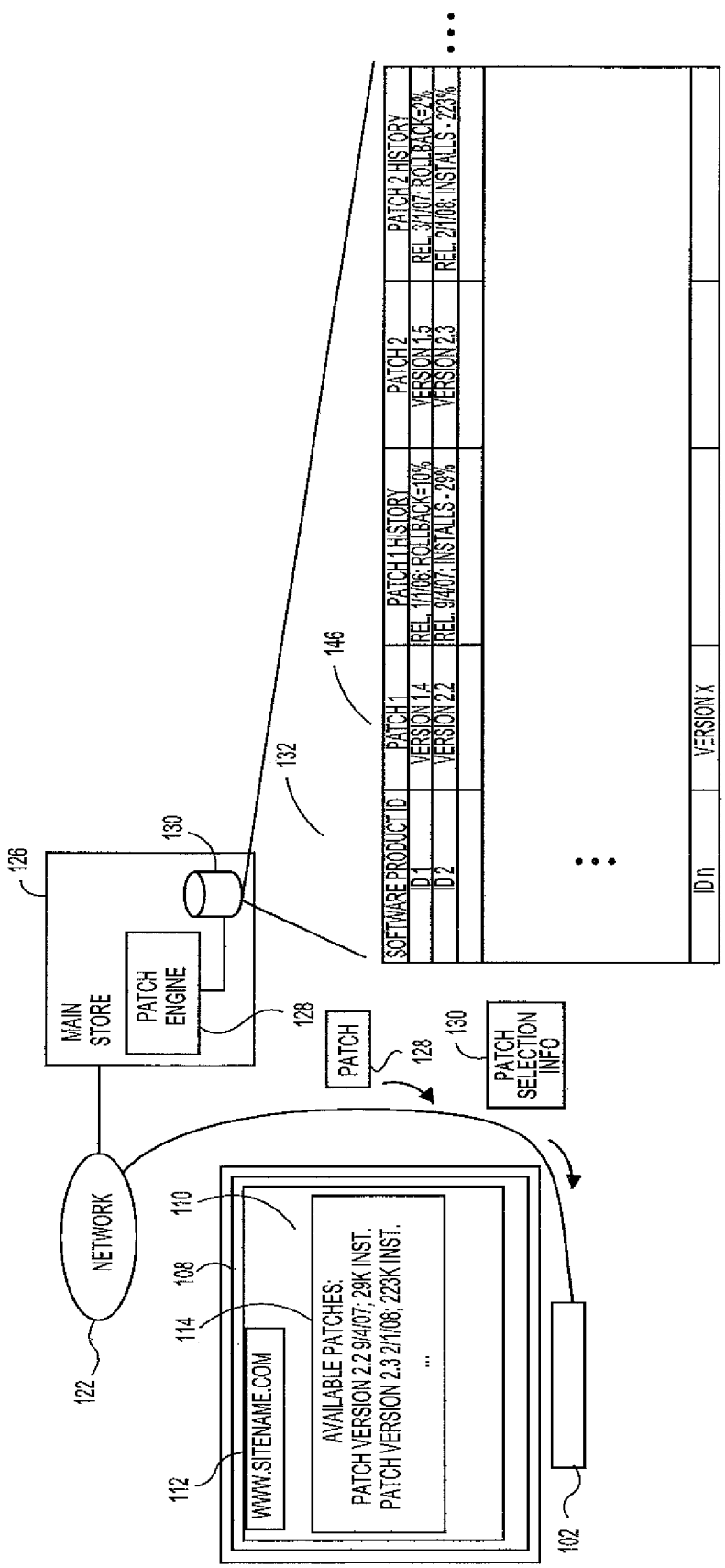
FIG. 2 illustrates an exemplary patch server configuration, according to various embodiments.

In embodiments as shown in FIG. 2, patch engine 128 can build and maintain a patch selection table 132 in patch store 126. The first column of patch selection table 132 can contain a field for a software product ID 134 received from client 102, indicating the ID of the application 136 or other software product the user wishes to update/patch. Other entries in each row of patch selection table 132 can comprise patch version and history fields 146 representing the versions of patches available for a software product identified by its software product ID 134, along with patch history information for each version of the set of patches. Patch engine 124 returns matching patches and associated information from patch version and history fields 146 to the requesting client 102 in patch selection information 130. Patch selection information 130 is used to generate patch selection dialog 114, in which the set of available versions or generations of patches are presented to the user along with patch history information for user selection. It may be noted that in embodiments, patch history and related information can be stored in other configurations than patch selection table 132, such as in a hierarchical or linked node structure. Other configurations are possible.

Figure 3:
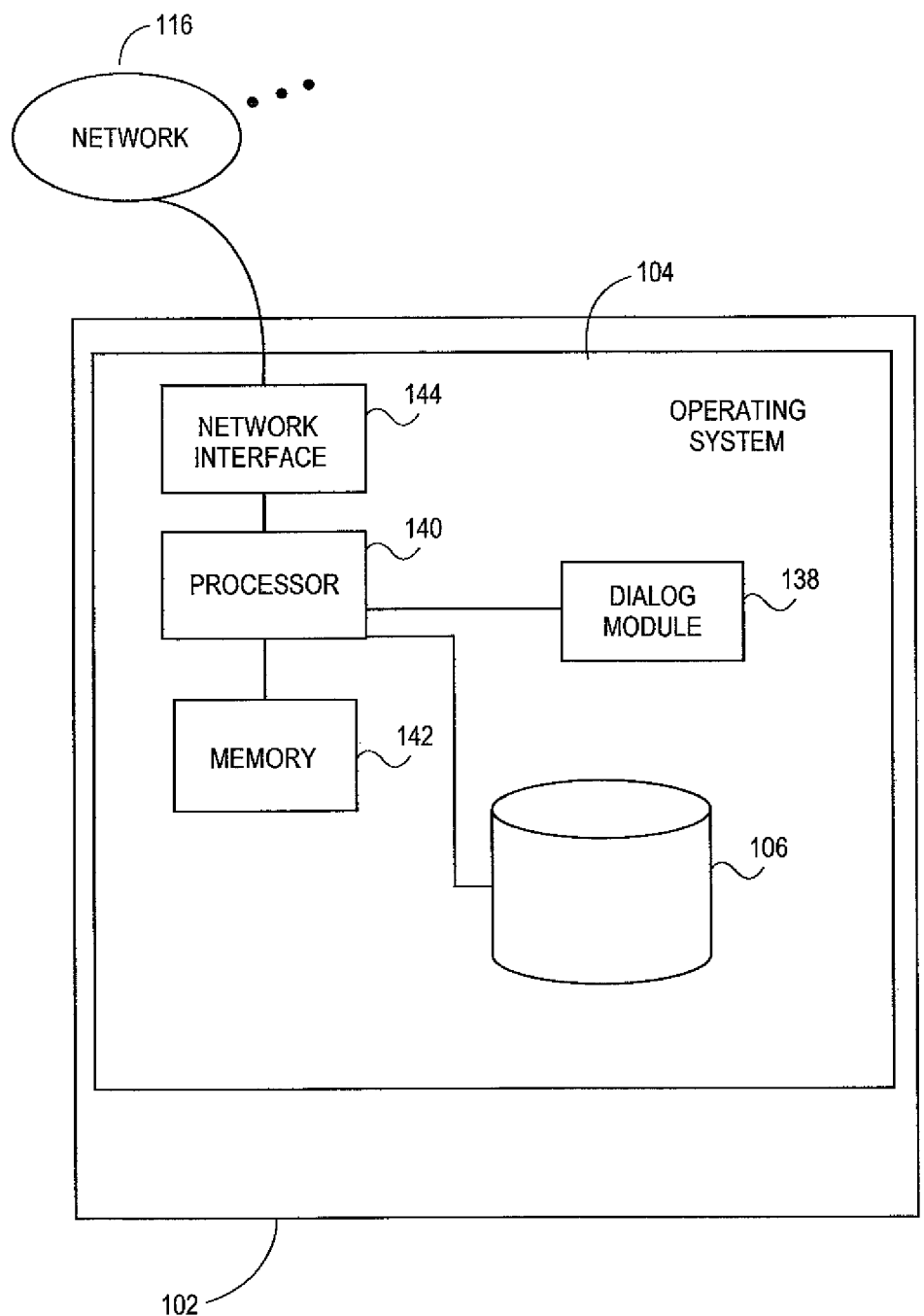
FIG. 3 illustrates an exemplary hardware configuration for a client, according to various embodiments.

FIG. 3 illustrates an illustrative configuration of hardware and other resources incorporated in client 102, according to embodiments. In embodiments as shown, client 102 can comprise a processor 140 communicating with memory 142, such as electronic random access memory, operating under control of or in conjunction with operating system 104. Processor 140 also communicates with client data store 106, which can store patch selection information 130 and other data, as well as dialog module 138 that can, for instance, generate and present patch selection 114 and/or other user dialogs. Processor 140 further communicates with network interface 144, such as an Ethernet or wireless data connection, which in turn communicates with network 122, such as the Internet or other public or private networks, to communicate with patch server 122 hosting download site 112. Other configurations of client 102, associated networked connections, and other hardware and software resources, are possible.

Figure 4:
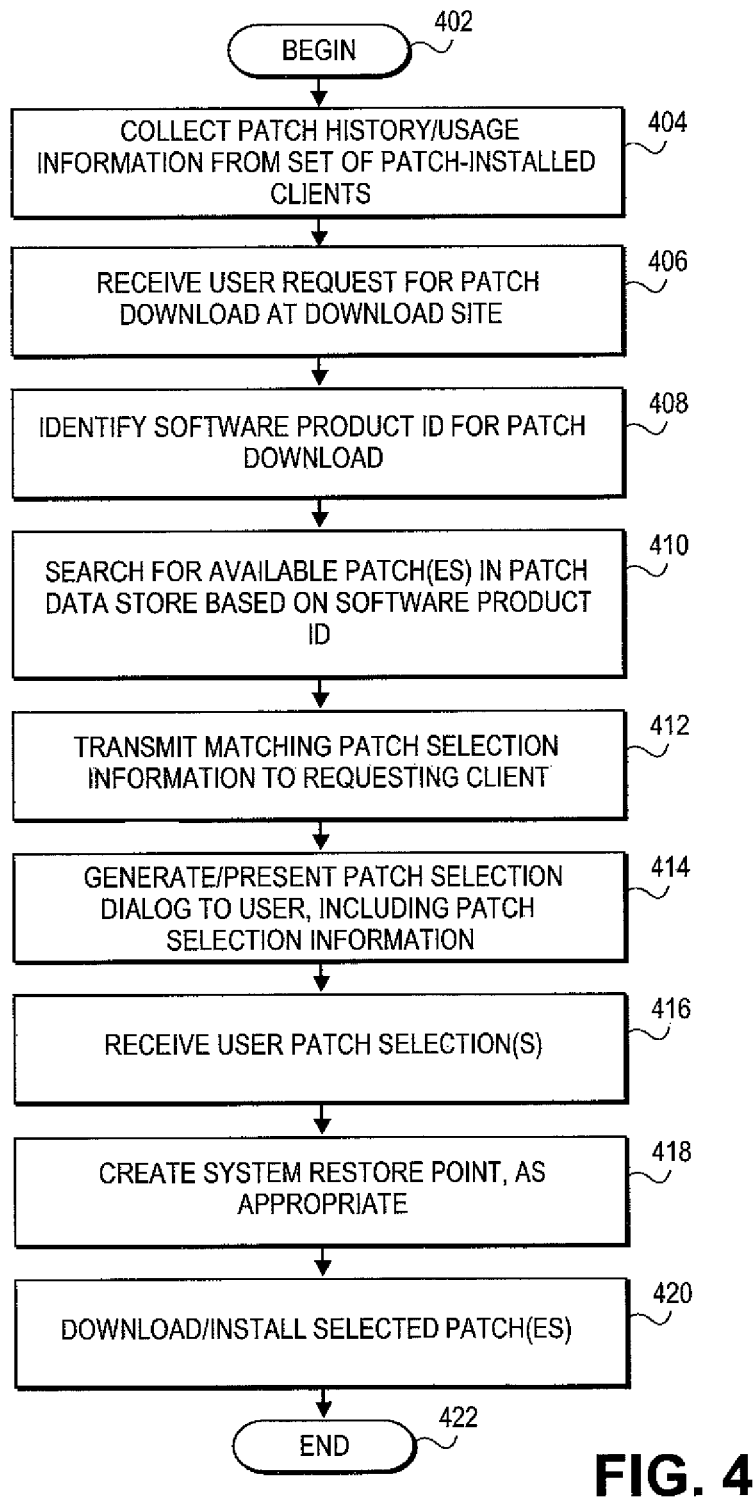
FIG. 4 illustrates a flow diagram of overall patch management processing, according to various embodiments.

FIG. 4 illustrates a flow diagram of overall patch management processing, according to various embodiments. In step 402, processing can begin. In step 404, patch history, including patch installation and usage information, is collected from a set of patch-installed clients 118, for example via automatic or download-triggered reporting via network 116 to patch server 122. In step 406, a user request from client 102 for a patch download can be received at download site 112. In step 408, the software product ID 134 of the software application or other product for which a patch is requested is identified. In step 410, patch engine 128 of patch server 122 hosting download site 112 can search for one or more available patch 128 in patch data store 126 based on software product ID 134.

In step 412, patch server 122 transmits patch selection information 130 for any matching software product ID 134 to the requesting client 102. In step 414, a patch selection dialog 114 is generated and presented to the user on client 102. In step 416, patch server 122 can receive any one or more user patch selection(s) for download and/or installation. In step 418, a system restore point can be created on client 102, to establish a safe configuration return point should the installation of selected patch 128 fail. A system restore point can for instance be created by or via browser 110 and/or operating system 104. In step 420, one or more selected patch 128 can be downloaded from patch server 122 to client 102. In embodiments patch 128 can be immediately installed, or can be stored to client data store 106 for later installation. In step 422, processing can repeat, return to a prior processing point, jump to a further processing point, or end, as understood by persons skilled in the art.

The foregoing description is illustrative, and variations in configuration and implementation may occur to persons skilled in the art. For example, while embodiments have been described in terms of the distribution of single software patches, in embodiments more than one patch can be viewed and selected at a time. Similarly, while embodiments have been described in which the patch history and patch binaries or other patch code are stored in a single patch server, in embodiments the aggregate patch history and/or patch code can be stored at multiple sites. Further, while embodiments have been described in which the patch code is applied to a software application, in embodiments the patch can be for other types or categories of software, such as operating systems, utilities, drivers, or other software or code. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
    collecting a plurality of patch usage information from a set of clients participating in a user pool via a network, the set of clients associated with a set of software products installed on the set of clients;
    aggregating the plurality of patch usage information from the set of clients in a data store, wherein the aggregated plurality of patch usage information comprises a plurality of rollback count values that indicate a number of rollback operations performed by the set of clients for a corresponding patch;
    receiving a request for a patch from a client;
    identifying one of the set of software products being associated with the requested patch;
    identifying one or more patches that are associated with the identified set of software products of the set of software products;
    generating, by a processor, total rollback count values for the one or more identified patches using the aggregated plurality of patch usage information;
    transmitting, by the processor, data describing the one or more patches and the total rollback count values corresponding to the one or more patches to the client via the network;
    receiving a user selection of the one or more patches for download via a patch selection dialog presented to the user; and
    downloading the selected patch to the client, wherein the selected patch is installed on the client.

2. The method of claim 1, wherein the data describing the one or more patches further comprises
    at least one of patch version information, bug report information, software compatibility information, or hardware compatibility information.

3. The method of claim 1, further comprising:
    creating a system restore point before the selected patch is installed.

4. The method of claim 1, wherein the set of software products comprises at least one of an application, an operating system, a utility, or a driver.

5. A system comprising:
    an interface to a set of clients participating in a user pool, the set of clients associated with a set of software products installed on the set of clients; and
    a processor coupled to the interface to
        collect a plurality of patch usage information from the set of clients,
        aggregate the plurality of patch usage information from the set of clients in a data store,
        wherein the aggregated plurality of patch usage information comprises a plurality of rollback count values that indicate a number of rollback operations performed by the set of clients for a corresponding patch,
        receive a request for a patch from a client,
        identify one of the set of software products being associated with the requested patch;
        identify one or more patches that are associated with the identified software products of the set of software products;
        generate total rollback count values of the one or more identified patches using the aggregated plurality of patch usage information,
        transmit data describing the one or more patches and the total rollback count values corresponding to the one or more patches to the client,
        receive a user selection of the one or more patches for download via a patch selection dialog presented to the user; and
        download the selected patch to the client, wherein the selected patch is installed on the client.

6. The system of claim 5, wherein the data describing the one or more patches further comprises at least one of patch version information, bug report information, software compatibility information, or hardware compatibility information.

7. The system of claim 5, wherein the client creates a system restore point before installing the selected patch.

8. The system of claim 5, wherein the set of software products comprises at least one of an application, an operating system, a utility, or a driver.

9. The system of claim 5, wherein the processor executes a patch engine associated with a patch server.

10. A non-transitory computer-readable medium including instructions that, when executed by a processor, cause the processor to perform a method comprising:
    collecting, by the processor, a plurality of patch usage information from a set of clients participating in a user pool, the set of clients associated with a set of software products installed on the set of clients;

aggregating the plurality of patch usage information from the set of clients in a data store, wherein the aggregated plurality of patch usage information comprises a plurality of rollback count values that indicate a number of rollback operations performed by the set of clients for a corresponding patch;

receiving a request for a patch from a client;

identifying one of the set of software products being associated with the requested patch;

identifying one or more patches that are associated with the identified software products of the set of software products;

generating, by the processor, total rollback count values of the one or more identified patches using based on the aggregated plurality of patch usage information;

transmitting data describing the one or more patches and the total rollback count values corresponding to the one or more patches to the client;

receiving a user selection of the one or more patches for download via a patch selection dialog presented to the user; and downloading the selected patch to the client, wherein the selected patch is installed on the client.

11. The non-transitory computer-readable medium of claim 10, wherein the data describing the one or more patches further comprises:

at least one of patch version information, bug report information, software compatibility information, or hardware compatibility information.

12. The non-transitory computer-readable medium of claim 10, wherein the set of software products comprises at least one of an application, an operating system, a set of utilities utility, and a set of drivers.

* * * * *